Dec. 20, 1960   P. C. HUTTON   2,965,349
FLEXIBLE MOUNTINGS
Filed May 12, 1958   5 Sheets-Sheet 1
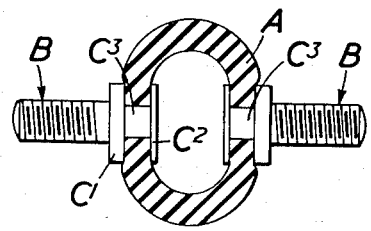
FIG. 1.
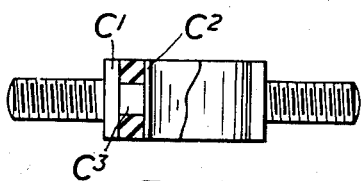
FIG. 2.
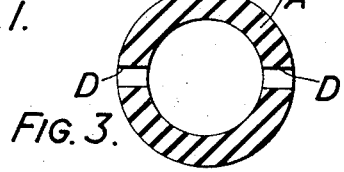
FIG. 3.
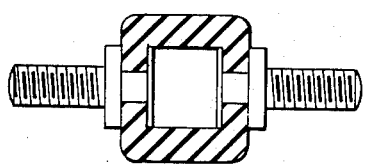
FIG. 4.
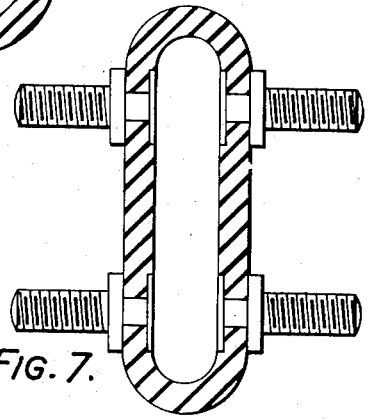
FIG. 7.
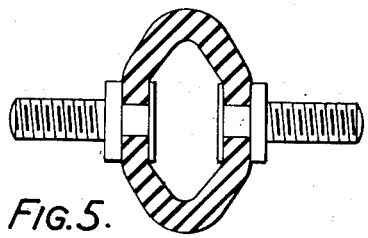
FIG. 5.
FIG. 6.
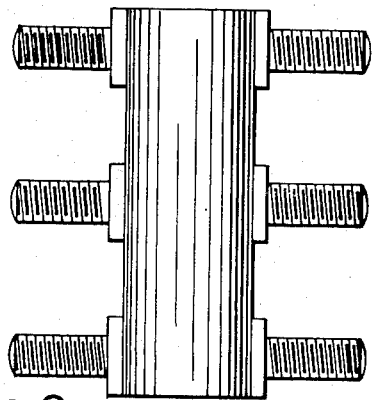
FIG. 8.
INVENTOR
PHILIP C. HUTTON
BY
Holcomb, Wetherill & Brisebois
ATTORNEYS Dec. 20, 1960 P. C. HUTTON 2,965,349
FLEXIBLE MOUNTINGS
Filed May 12, 1958 5 Sheets-Sheet 2

INVENTOR
PHILIP C. HUTTON
BY
Holcombe, Wetherill & Brisebois
ATTORNEYS

Dec. 20, 1960

P. C. HUTTON 2,965,349

FLEXIBLE MOUNTINGS

Filed May 12, 1958

INVENTOR
PHILIP C. HUTTON
BY
Holcombe, Wetherill & Brisebois
ATTORNEYS

Dec. 20, 1960     P. C. HUTTON     2,965,349
FLEXIBLE MOUNTINGS

Filed May 12, 1958     5 Sheets-Sheet 5

INVENTOR
PHILIP C. HUTTON

BY
Holcombe, Wetherill & Brisebois
ATTORNEYS

United States Patent Office 2,965,349
Patented Dec. 20, 1960

2,965,349

FLEXIBLE MOUNTINGS

Philip Charles Hutton, Crawley, England, assignor to Silentbloc Limited, Crawley, England, a British company Filed May 12, 1958, Ser. No. 734,712

Claims priority, application Great Britain Mar. 6, 1956

14 Claims. (Cl. 248—358)

This invention relates to flexible supports and is concerned with the provision of a simple construction which is relatively cheap to produce and in which the life of the support will be satisfactory.

According to one aspect of the present invention a flexible support comprises a body of flexible resilient material including a peripheral wall extending around a central space, one end at least of which is open, and two connecting studs projecting outwards from the said peripheral wall at spaced points and having means which secure them to the said peripheral wall and comprise a rod portion on each stud extending through and engaging the bore of a hole in the said peripheral wall, and spaced annular shoulders on the stud engaging co-operating shoulders constituted by the surfaces of the material around the opposite ends of the hole. Preferably the two holes are in line with one another.

Conveniently the material surrounding each hole is circumferentially stretched to grip the rod portion of the stud, and may be axially compressed between the annular shoulders.

According to another aspect of the invention a flexible support comprises a body of flexible resilient material including a peripheral wall extending around a central space, one end at least of which is open, and two connecting studs projecting outwards from the said peripheral wall at spaced points and having means which secure them to the said peripheral wall and comprise a rod portion on each stud extending through and engaging the bore of a hole in the said peripheral wall, and spaced annular shoulders on the stud engaging co-operating shoulders constituted by the surfaces of the material around the opposite ends of the hole and the material surrounding the hole may be axially compressed between the annular shoulders and/or circumferentially stretched to grip the rod portion of the stud.

The cross sectional shape of the peripheral wall may be of different forms depending on what characteristics it is desired that the mounting should give. Thus the mounting may be of circular or oval shape or it may be of rectangular cross section, the stud projecting from opposite sides of the bushing.

In another form of the invention the material is in the form of a ring open at least at one end and two connecting studs are provided projecting respectively from the opposite side faces of the ring at spaced points.

According to another aspect of the present invention a flexible support comprises a body of flexible material having two studs extending outwards from it coaxially in substantially diametrically opposite directions, each stud comprising a rod portion which extends through and engages the bore of a hole in the body and spaced annular shoulders secured to the rod portion at each end of the hole, marginal portions of the body adjacent the two holes being interconnected by a connecting portion or connecting portions lying in at least three regions distributed around the axis of the studs.

In one arrangement the connecting portions are afforded by a closed wall which may be of spherical form.

In another arrangement four separate connecting portions are provided equally spaced around the axis. The connecting portions may extend around a central space which is filled with a material having vibration damping properties.

The invention is also concerned with a method of assembling a support having a piece of flexible resilient material with a hole extending through it and a stud comprising a rod portion which extends through and engages the bore of the hole and spaced annular shoulders secured to the rod portions at each end of the hole, in which the stud is mounted on the wide end of a tapered mandrel having a maximum cross section at least as great as that of the annular shoulders, and a minimum cross section substantially equal to or less than the hole in the flexible material, the mandrel being passed through the hole to expand it and one shoulder thereby being drawn through the hole and the material around the hole being allowed to spring back between the shoulders. Where the flexible material is in the form of a ring having two holes in its periphery at substantially diametrically opposite points two studs are mounted on the mandrel with one shoulder of each in contact, one stud being received in a hollow in the wide end of the mandrel so that when the mandrel is passed direct through the two holes in the ring the leading stud is received by the second hole and the following stud is received in the first hole in the ring.

The invention may be carried into practice in a number of ways but several specific embodiments will now be described by way of example with reference to the accompanying drawings in which:

Figure 1 shows a section through a flexible mounting according to the present invention, Figure 2 is a part sectional plane of the mounting of Figure 1, Figure 3 is a section of the rubber bushing in its free state before assembly in the mounting of Figures 1 and 2, Figures 4, 5 and 6 show modifications of the embodiment of Figures 1 to 3.

Figure 7 is a sectional elevation of a further embodiment,

Figure 8 is a plan of another embodiment,

Figure 9:
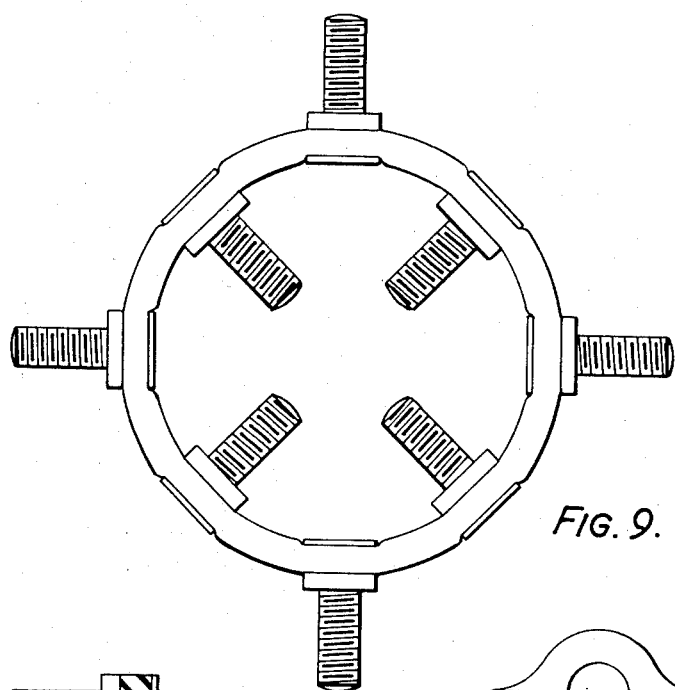
Figure 9 is a plan view of another embodiment.

Preliminary to describing the several illustrative forms of the invention in detail it is to be noted that all employ flexible material such as rubber to which are secured mounting studs the form of which is the same in all embodiments. It is also to be noted that certain embodiments are described in my British patent application No. 7,062/56 filed March 6, 1956. The corresponding United States patent application being Serial No.

643,290, filed March 1, 1957, and entitled Flexible Mountings, now abandoned, of which this application is a continuation-in-part.

Referring to Figures 1 to 3 a simple form of the invention is shown wherein a ring of rubber A has secured to it a pair of studs B each having a pair of spaced flanges $C^1$ and $C^2$ at one end whilst its other end is screwthreaded as shown for securing to the appropriate one of the two parts which the mounting connects.

Figure 3 illustrates the circular form of the ring of rubber before the studs are secured to it. It has a pair of diametrically opposed holes D of a diameter slightly less than the portion $C^3$ of the stud between the flanges $C^1$ and $C^2$. The thickness of the rubber i.e. the relaxed length of the holes D is on the other hand slightly greater than the length of the space between the flanges.

Accordingly in the complete mounting shown in Figure 1, the rubber material between the flanges is, with respect to the hole, stretched circumferentially and somewhat compressed axially. Such an arrangement gives the completed mounting a good resilience and ensures that the studs are retained firmly in their respective holes, although it will be appreciated that if desired a bonding agent may also be employed to secure the adjoining surfaces of the stud and rubber ring. It will be noticed that by virtue of the stresses within the ring in the completed mounting the rubber ring tends to take a rather oval form as shown in Figure 1.

The form of the ring can be varied depending on the characteristics it is desired that the mounting should give. Thus, as shown in Figure 4 it may be of square cross section with identical studs secured to opposite sides, whilst in Figure 5 the completed mounting is somewhat diamond-shaped.

It will be appreciated that the resilience of the material employed and the dimensions of the bushing can greatly affect its characteristics and in certain instances it is desirable to fill partly or completely the space within the body with a further material having dampening properties of the frictional, air, hysteresis, viscous or other type for instance felt, sponge rubber of the kind having its pores interconnected (such as that shown in Figure 6), a viscous material, or silicon rubber. In the example shown in Figure 6, a suitably shaped button of sponge rubber has been pressed into the bore of the rubber bushing ring.

In all the embodiments so far described the tubular body or bushing has been in the form of a ring having only two studs extending in opposite directions.

In the embodiment shown in Figure 7 the body is of substantially rectangular cross-section with rounded ends and two pairs of studs are secured to it, one pair being secured above the other.

In the embodiment shown in Figure 8 the tubular body is of elongated form having three pairs of studs secured along its length the studs constituting each pair extending in opposite directions. The form of the studs and the shape and size of the flanges, and holes in the body in the embodiments of both Figures 7 and 8 are similar to the earlier embodiments.

In yet another embodiment of the invention shown in Figure 9 the ring of material is of sufficient size to enable four studs to be mounted within the ring and extend towards one another in radial directions at 90° intervals. On the outside of the ring, four further studs are similarly secured and extened radially outwards at equal distances between the inner studs.

Figure 10:
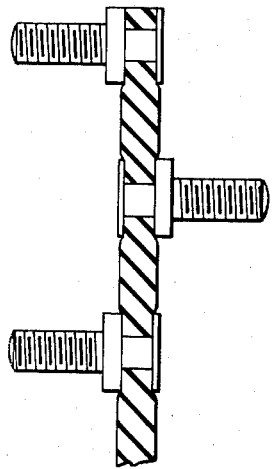
Figure 10 is a sectional elevation of a further embodiment.

In a further embodiment shown in Figure 10 the layer of resilient material is of sheet form and is provided with three studs, two of which extend normally from the sheet in one direction and the third, situated between the first two, extends normally from the sheet in the opposite direction.

Figure 11:
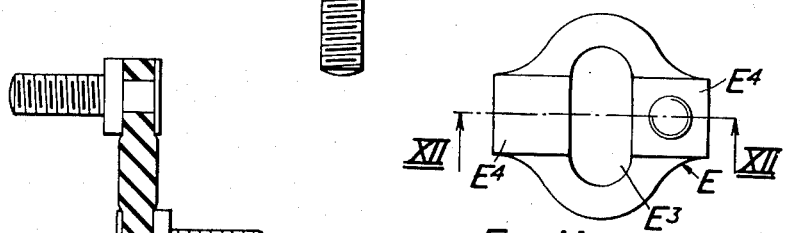
Figures 11 and 12 are plan and sectional elevations respectively of yet another embodiment.
Figure 12:
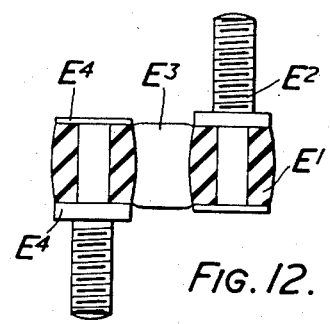

Figures 11 and 12 illustrate a further embodiment wherein a ring E has a pair of thickened portions $E^1$ at diametrically opposite points and through which studs $E^2$ are mounted so as to extend in opposite directions sideways or parallel to the axis of the space $E^3$ in the ring. In this case the spaced flanges $E^4$ are of square form.

Figure 20:
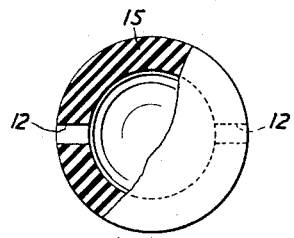
Figure 20 is a plan view partly in section of a body of flexible material according to another embodiment.
Figure 21:
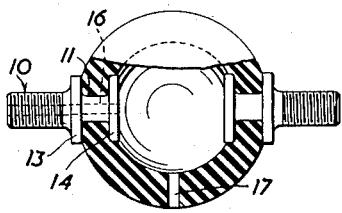
Figure 21 is a view of the flexible body of Figure 1 with a pair of mounting studs secured to it.

In the embodiments shown in Figures 20 to 26 a body of flexible material such as rubber is again employed to which are secured mounting studs of the same form as in the other arrangements. Thus, referring to Figures 20 and 21 each stud 10 has a rod portion 11 extending through a hole 12 in the material and has secured to it spaced flanges 13 and 14 the distance between which is slightly less than the thickness of the rubber before the stud is secured to it. The hole 12 in the rubber through which the stud passes is, in its free state as shown in Figure 21, of a diameter slightly less than that of the rod portion 11 of the stud so that the material of the rubber between the flanges 13 and 14 is circumferentially stretched to grip the rod portion 11 whilst it is axially compressed between the flanges 13 and 14.

In the embodiment shown in Figures 20 and 21 the rubber is in the form of a hollow spherical ball 15 having two holes 12 at diametrically opposite points within which studs of the kind referred to are secured in the manner shown in Figure 21. These studs may be secured in position by employing apparatus of the kind referred to later with reference to Figures 17 to 19. To permit air to escape and enter the space within the ball when the ball changes shape under load a small venting hole 16 is provided down the centre of one stud or alternatively a hole 17 is provided in the wall of the ball.

Figure 22:
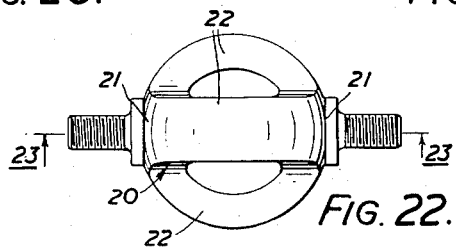
Figure 22 is a plan view of yet another embodiment.
Figure 23:
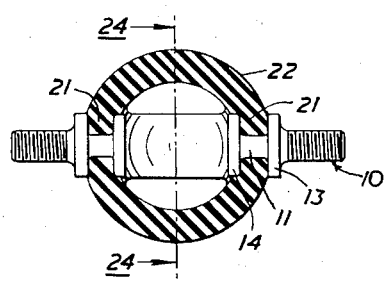
Figure 23 is a section on the line 4—4 of Figure 22.
Figure 24:
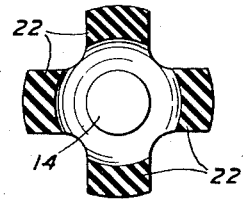
Figure 24 is a section on the line 5—5 of Figure 23.

In an alternative embodiment shown in Figures 22 to 24 the body of rubber is again of generally spherical form but has four segmental portions 20 cut away so as to leave marginal portions 21 of the body around the two diametrical holes in which the studs are secured. These marginal portions 21 are interconnected by four semi-circular connecting portions 22 distributed at 90° intervals around the axis of the studs.

Figure 25:
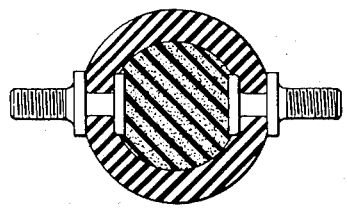
Figures 25 and 26 are views similar to Figures 23 and 22 respectively of a further embodiment.
Figure 26:
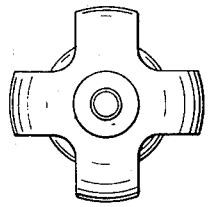

If desired the vibrational characteristics of the support may be varied by the inclusion in the spherical space enclosed by the interconnecting portions 22 of the body of a spherical solid ball of material having properties of the frictional, air, hysteresis, viscous or other type, for instance felt, sponge rubber of the kind having its pores interconnected, a viscous material, or a silicone rubber. Such an arrangement is shown in Figures 25 and 26. If desired the inner flange of the stud may be enlarged so as to protrude within the centre space in which case the vibration damping ball is cut away appropriately to surround that flange.

Two methods of assembling the studs to the flexible material of the mounting will now be described by way of reference to the mounting of Figures 1 to 3 although it will be appreciated that the same methods may be employed with most of the other embodiments.

Figure 13:
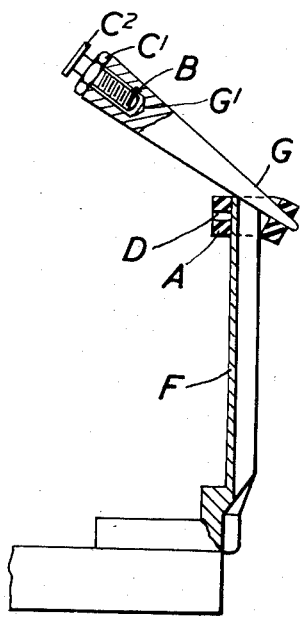
Figures 13 to 16 show a series of stages in one method of assembly of the mounting of Figures 1 to 3 and Figures 17 to 19 show a similar series of stages in a second method of assembly.

In the first method to be described with reference to Figures 13 to 16 a jig is employed which comprises a vertical channel section support F having a semi-circular cross section of a radius approximately equal to the bore of the ring of the bush A. The bush is placed over the top of the stand as shown in Figure 13 with the two holes D so placed that one of them is positioned to the right at the open side of the channel. The thin end of a tapered mandrel G having a recess $G^1$ at its upper end to receive the screwthreaded end of the stud B is then inserted through the right hand hole from the inside of the ring.

Figure 14:
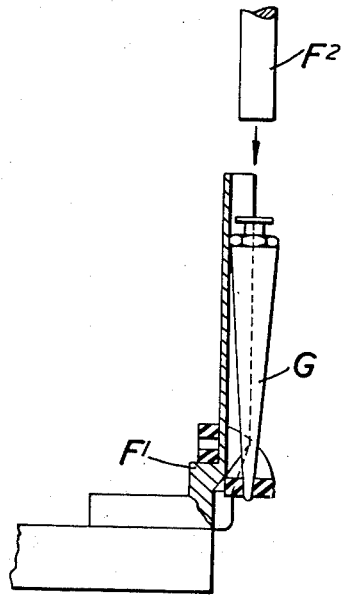
Figure 15:
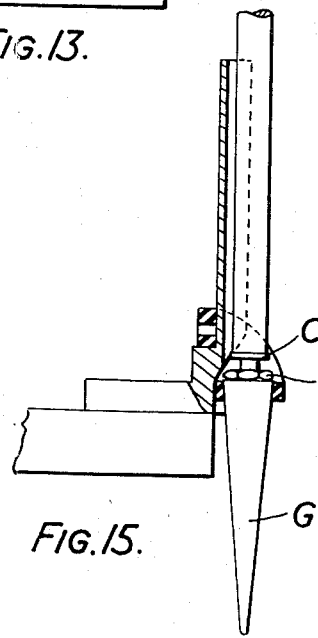
Figure 16:
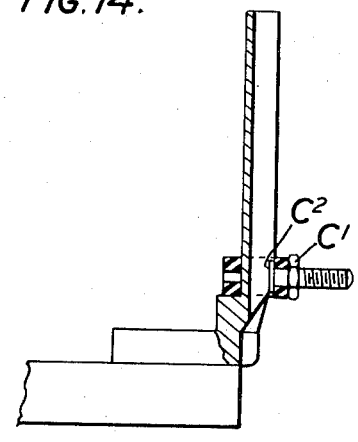

To enable this it will be seen from Figure 13 that the material of the ring has to be twisted so that the hole receiving the mandrel is vertically aligned as shown in Figure 14, and the ring is then slid down the support F until it abuts against a stop $F^1$. The tapered mandrel is then forced through the hole in the stud by engagement of a punch $F^2$ on the flange $C^2$ of the stud.

The mandrel is shown in its final position in Figure

15. The larger end of the mandrel is of a diameter equal to that of the lower flange C¹ of the stud so that the material of the flange in the position shown in Figure 15 has expanded to enable the flange to pass through it. It will be appreciated that as soon as the flange has passed through the hole in the ring the material of the ring can spring back between the flanges C¹ and C². As has already been mentioned the space between the flanges is less than the thickness of the material and the diameter of the hole D is slightly smaller than that of the portion of the stud between the flanges so that the material of the bush is stretched circumferentially and compressed axially around the hole when in its assembled position.

Once the stud for one hole has been inserted in position the ring is then removed from the support, turned round, replaced and a second stud secured in position in the same manner.

Figures 17, 18, 19:
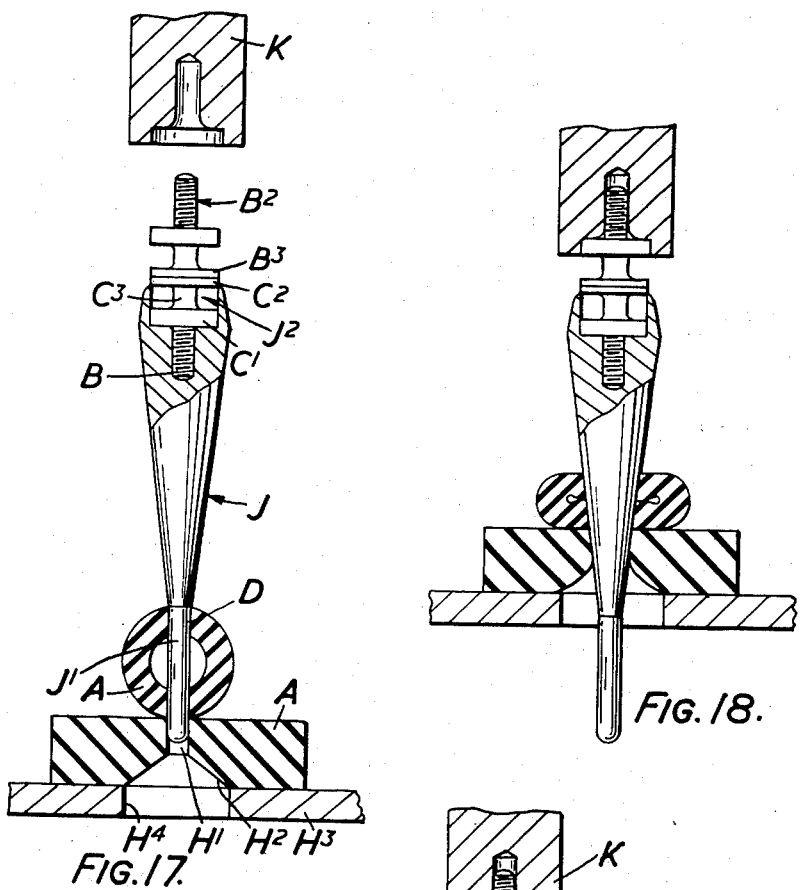

In a second method shown in Figures 17 to 19 the ring or bush is placed with its two holes C³ in vertical alignment over a thick rubber base H having a small hole H¹ in its upper surface extending part way through and expanding into a conical hole H². The base is mounted on a base plate H³ having a hole H⁴ of the same diameter as the wide end of the conical hole H².

A tapered mandrel J having a cylindrical extension J¹ at its end of a diameter equal to that of the holes D in the bush is then inserted vertically downwards as shown in Figure 17. The cylindrical extension J¹ passes through both holes D before the tapered part reaches the holes in the manner shown in Figure 17. The upper, wider, end of the mandrel has in it a hollow J² formed to receive the screwthreaded end of one stud B and also the adjacent flange C¹ and the intermediate portion C³ of the stud between the flanges.

The second, upper, flange C² stands just beyond the hollow end. A second stud B² is then inserted and placed with its end flange B³ lying on top of the flange C² of the first stud. A punch K, hollowed to receive the screwthreaded portion and upper flange of the second stud B² is then employed to force the mandrel downwards as shown in Figure 18.

As shown in Figure 19 the material of the ring A is distorted around the holes so that they are expanded to a diameter greater than that of the flanges C¹ and C² on the lower stud. As this is happening the material of the base H also expands to accommodate the mandrel as it passes downwards.

When the stage shown in Figure 19 is reached the material around the upper hole of the ring is aligned with the space between the flanges of the upper inverted stud so that it springs back into this space as shown. The material around the lower hole also springs into position in the space between the flanges C¹ and C² of the lower bush as soon as the mandrel is lowered beyond the position shown in Figure 19. To assist this it will be noticed that the mandrel reaches its widest diameter just before its upper end whereupon it narrows off again slightly until at its very end it is of the same diameter as the flanges on the studs.

As soon as the two studs have been secured in their respective holes and the mandrel removed, the bushing, which is collapsed during assembly, returns to the position shown in Figure 1 and the base H also returns to its relaxed position as shown in Figure 17.

Whilst, in the specific embodiments shown in the drawings, the flanges have all been shown integral with the rod portions of the studs it will be appreciated that, if desired one or both of the shoulders may be in the form of a washer secured to the stud by a nut or in other instances riveted in position. Thus where the mounting is of considerable size it may be desirable to exert the axial compression of the material by clamping up the shoulders mechanically for instance by means of the nuts on screwthreaded portions of the stud.

What I claim and desired to secure by Letters Patent is:

1. A flexible support comprising a body of flexible material having two studs extending outwards from it coaxially in substantially diametrically opposite directions, each stud comprising a rod portion which extends through and engages the bore of a hole in the body and spaced annular shoulders secured to the rod portion at each end of the hole, marginal portions of the body adjacent the two holes being interconnected by connecting portions lying on at least three sides of the axis of the studs, and said material being circumferentially stretched to grip the rod portion of the studs and axially compressed between the shoulders.

2. A flexible support as claimed in claim 1 in which the connecting portions form a closed wall.

3. A flexible support as claimed in claim 2 in which the closed wall is of spherical form.

4. A flexible support as claimed in claim 3 in which a venting passage is provided connecting the space within the body to atmosphere.

5. A flexible support as claimed in claim 3 in which the connecting portions extend around a central space which is filled with a material having vibration damping properties.

6. A flexible support as claimed in claim 1 including four separate connecting portions equally spaced around the axis.

7. A flexible support as claimed in claim 6 in which the connecting portions extend around a central space which is filled with a material having vibration damping properties.

8. A flexible support comprising a body of flexible resilient material including a peripheral wall extending around a central space, one end at least of which is open, and two connecting studs projecting outwards from the said peripheral wall at spaced points, said studs having means which secure them to the said peripheral wall and comprise a rod portion on each stud extending through and engaging the bore of a hole in the said peripheral wall, and two fixed spaced annular shoulders on the stud engaging cooperating shoulders constituted by the two opposite surfaces of that portion of said peripheral wall which surrounds said hole, said portion consisting of a single layer of material circumferenitlly stretched to grip the rod and axially compressed between the annular shoulders on said stud.

9. A flexible support comprising a body of flexible resilient material including a peripheral wall extending around a central space, one end at least of which is open, and two connecting studs projecting outwards from the said peripheral wall at spaced points, said studs having means which secure them to the said peripheral wall and comprise a rod portion on each stud extending through and engaging the bore of a hole in the said peripheral wall, and two fixed spaced annular shoulders on the stud engaging cooperating shoulders constituted by the two opposite surfaces of that portion of said peripheral wall which surrounds said hole, said portion consisting of a single layer of said material axially compressed between the annular shoulders.

10. A flexible support as claimed in claim 8 in which the peripheral wall has two elongated flat sides extending substantially parallel to one another and joined together by curved portions, and is provided with two pairs of studs on each side.

11. A flexible support as claimed in claim 8 in which the peripheral wall is of extended tubular form and has two equal rows of studs, the studs of one row being diametrically opposite studs of the other row.

12. A flexible support as claimed in claim 8 in which the peripheral wall has a number of studs extending away from its outer periphery and a number of studs extending inwards from its inner periphery in a radial direction.

13. A flexible support as claimed in claim 8 in which the peripheral wall is filled with a material having vibration-dampening properties.

14. A flexible support comprising a ring of resilient material open at least at one end and two connecting studs projecting respectively from the opposite side faces of the ring at spaced points and having means which secure them to the said ring, said means comprising a rod portion on each stud extending through and engaging the bore of a hole in the said wall, and spaced annular shoulders integral with the stud engaging cooperating shoulders constituted by the two opposite surfaces of that portion of said peripheral wall surrounding the hole, said portion consisting of a single layer of said material circumferentially stretched to grip the rod portion of the stud and axially compressed between the annular shoulders thereof.

References Cited in the file of this patent

UNITED STATES PATENTS

| | | |
|---|---|---|
| 1,488,940 | Robinson | Apr. 1, 1924 |
| 1,739,270 | Thiry | Dec. 10, 1929 |
| 1,863,370 | Geyer | June 14, 1932 |
| 2,031,797 | Tarbox | Feb. 25, 1936 |
| 2,510,963 | Dibblee | June 13, 1950 |
| 2,558,589 | Skolfield | June 26, 1951 |

FOREIGN PATENTS

| | | |
|---|---|---|
| 485,963 | Great Britain | May 27, 1938 |
| 508,248 | Canada | Dec. 14, 1954 |
| 658,898 | Great Britain | Oct. 17, 1951 |